United States Patent Office 3,131,198
Patented Apr. 28, 1964

3,131,198
PROCESSING OF AQUEOUS EXTRACTS OF BARK
Arnulf K. Esterer, and Lionel E. Dowd, Longview, Wash., assignors to Weyerhaeuser Company, Tacoma, Wash., a corporation of Washington
No Drawing. Filed July 24, 1961, Ser. No. 125,948
7 Claims. (Cl. 260—345.2)

This invention relates to the separation of chroman derivatives from water extracts of vegetable material and has particular reference to the isolation of the substance dihydroquercetin from the water extract of barks of trees. It further relates to the providing of a water extract residue having increased utility.

Dihydroquercetin, until recently, was virtually unknown and available only then in limited quantities at a high cost. However, it is now known that certain woods, and particularly the barks of the Douglas fir tree and of the Jeffrey pine tree contain substantial quantities of dihydroquercetin and thus are a potential source for providing sufficient quantities for widespread usage in such fields as pharmaceuticals, industrial antioxidants, and synthetic resins.

Although large volumes of bark accumulate at log processing plants and various attempts have been made to isolate chemical substances from bark, a commercially economical method for isolating dihydroquercetin has not heretofore been successfully developed. Previous attempts have largely made use of laboratory procedures using organic solvent extraction of the bark and in general have been slow, costly and hazardous. Another method has been to extract bark with water at an elevated temperature providing an extract comprising dihydroquercetin, carbohydrates and a variety of phenols having various reactivities. When a typical sample of whole Douglas fir bark is extracted with hot water, the resulting extract contains approximately 15% dihydroquercetin on an extract solids basis.

However, dihydroquercetin, although characterized by high positive temperature coefficient of solubility when it is the only solute in water solution, does not crystallize from the above complex water extract solution upon cooling, even after substantial concentration, particularly when it comprises less than about 25–30% of total dissolved solids. This is undoubtedly due to the fact that among the water soluble components in the water extract from bark there are certain substances which have the property of inhibiting crystallization of dihydroquercetin.

Among these same water soluble components there is also present certain substances which cause foaming and thereby detract from the usefulness of the water extract when used for such purposes as an oil well drilling mud additive.

Thus, although an aqueous extraction of vegetable material presents an attractive means of removing chemical substances having great utility, additional processing is required to separate these water solubles into components having improved utility.

It is thus a general object of this invention to provide a process for treating an aqueous extract of vegetable material containing dihydroquercetin to remove the dihydroquercetin and further to improve the properties and increase the utility of the remaining extract.

It is an object of the present invention to provide a method of separating dihydroquercetin from an aqueous extract of vegetable substance containing the same. A further object of the present invention is to provide a method of treating an aqueous extract of bark to provide dihydroquercetin and an oil well drilling mud additive. It is a further object to provide a method of removing dihydroquercetin from an aqueous extract containing the same by extraction with a selective solvent for dihydroquercetin.

These and other objects and advantages will be more apparent after referring to the following description and explanation of the present invention.

Although the process of this invention relates to obtaining dihydroquercetin from vegetable material containing the same, for illustrative purposes it will be described with reference to the bark of trees and in particular with reference to the bark of Douglas fir.

Douglas fir bark or fractions thereof comminuted so that a major portion passes an 8 mesh screen but is retained upon an 80 mesh screen (Tyler standard) having a moisture content of approximately 40% on a dry weight basis, is suitable as a raw material for this process. The cork fraction of Douglas fir bark is particularly suitable for this process as it contains the major portion of dihydroquercetin present in Douglas fir bark.

The bark is first treated with water at an elevated temperature. This may be done batchwise or by means of a series of batchwise treatments. However, it is economically more desirable to carry out the water extraction step by means of a continuous process. A particularly efficient extraction process comprises a countercurrent technique wherein the bark moves continuously in one direction and extract fluid moves continuously in the opposite direction whereby the spent bark is contacted by concentrated extract. A permissible modification comprises recycling a predetermined portion of extract or solid phase or both to the extraction cell of origin in order to increase the efficiency of extraction and to increase the concentration of extract. Either a single cell or a plurality of cells may be employed. A particularly desirable method is that disclosed in U.S. Patent 2,832,765, issued April 28, 1958, to James R. Roberts and Arthur S. Gregory. Phase separation takes place following each cell treatment. It is necessary that all phase separations be substantially complete in order to provide maximum extraction efficiency. Preferably the extraction takes place near the boiling point of water. When applied to Douglas fir bark or Douglas fir bark cork, consistencies of approximately 10% have been found useable and a typical aqueous extract contains approximately 3% of dissolved solids. In the case of Douglas fir bark extracted with water, the extract comprises typically, on a dry solids basis, approximately 15% dihydroquercetin, 5% of ether solubles other than dihydroquercetin, 28% of substances insoluble in ether but soluble in butanol, 32% of material insoluble in both diethyl ether and butanol but capable of forming a water insoluble material in the presence of lead ion and approximately 20% of material comprising carbohydrate substance. Thus, the process of water extraction serves to separate substantially quantitatively the dihydroquercetin in a mixture containing fewer components than the original raw material.

The present invention comprehends the treatment of such water extract, either at the concentration produced or after the removal of a substantial amount of water, with a water-immiscible solvent having a highly selective solvent action on the dihydroquercetin in said extract. It is a permissible technique to concentrate the aqueous extract substantially as, for example, to approximately 25% solids by evaporation of water to approximately ⅛ of the original volume. According to another modification of the invention, the aqueous extract may be dried to substantially the solid state which latter is extracted with the solvent.

The solvent which has been found to be effective in this dual role of quantitatively separating out the dihydroquercetin and at the same time decreasing the foaming tendencies of the remaining extract is amyl acetate in either the normal or iso form or as a mixture of isomers. Amyl acetate is readily available commercially, has a flash point of a approximately 80° F. and has a very low solubility in water. Consequently, it is easily and economically obtained, may be stored and handled with safety, and its low solubility in water makes its recovery simple and substantially quantitative.

Various standard methods may be used to contact the dihydroquercetin containing material with amyl acetate. The temperature of the extract is not a critical factor in that the distribution coefficient of dihydroquercetin between amyl acetate and water is of the order of 15 to 1 at 25° C. and about 5 to 1 at 75° C. However, due to some tendency to emulsify at lower temperatures, the preference would normally favor a temperature in the range of 75° C. An adjustment of the pH value of the extract from the existing pH value of 3.5 to about 6 is preferred.

The amyl acetate solution of dihydroquercetin provided by the process of this invention may be used as produced or may be concentrated. Additional processing is permissible, such as, the spray drying of the solution to produce the dried solid product; the concentration of the solution to permit dihydroquercetin to crystallize from the amyl acetate; and, preferably the addition of alkali, as for example sodium hydroxide, to the organic solution in sufficient quantities to transform the dihydroquercetin to the disodium salt followed by the treatment of the salt solution with water. The salt is substantially more soluble in water than in amyl acetate and consequently the salt partitions into the aqueous phase and there is effected a change of solvent as well as some separation of the dihydroquercetin from the minor proportion of impurities which were solubilized by the amyl acetate. The aqueous solution after phase separation from amyl acetate may be acidified to approximately pH 3 and the dihydroquercetin crystallized.

As mentioned previously the water extract containing the remaining water soluble bark material has utility as an additive to oil well drilling fluids. An additional and unexpected advantage of the method of this invention for the removal of dihydroquercetin from a mixture of water solubles is the substantial and, for all practical purposes, the complete elimination of the foaming characteristics of the remaining extract. This foaming tendency of the water extract from Douglas fir bark had been highly undesirable for oil well drilling fluids since air entrainment reduces the density of the fluid and thereby affects pumpability, pore sealing, and the flotation of rock chips and other debris.

Thus, the method of this invention provides for an efficient, non-hazardous, and economical one-step separation of dihydroquercetin from a water extract containing water soluble components of bark while at the same time eliminating the foaming characteristic of the remaining extract.

The following specific examples illustrate the process of this invention in greater detail:

Example I

Whole Douglas fir bark was comminuted in a hammermill so that the major portion would pass an 8-mesh screen but be retained upon an 80-mesh screen. The moisture content of the bark was approximately 40% on a dry weight basis. The comminuted bark was extracted with water maintained at a temperature of 90° to 100° C. using a countercurrent extraction method. The consistency of the slurry of bark and water was maintained at approximately 10%. The final extract contained approximately 3.1% water solubles solids of which 15% was dihydroquercetin as disclosed upon analysis.

8000 ml. of the aqueous extract was reduced in volume to 2000 ml. by evaporation of water from the solution. The concentrated solution was cooled to room temperature and was passed slowly through a volume-rate regulating device into the top of a column containing glass beads. Simultaneously amyl acetate at room temperature was pumped in at half volume rate through a port near the bottom of the tube. Due to the differences in density of the aqueous extract solution and the amyl acetate, the two substantially immiscible liquids diffused countercurrently through the tube over the surfaces of the beads. Means were provided for continuously removing the amyl acetate from the top of the column and the aqueous solution from the bottom of the column.

The 1000 ml. of amyl acetate solution was shaken thoroughly with 1000 ml. of 0.30 sodium hydroxide solution at room temperature. This served to transform the dihydroquercetin into its disodium salt which is markedly more soluble in water than in amyl acetate. This step was carried out quickly and at room temperature in order to avoid substantial oxidation of dihydroquercetin and hydrolysis of amyl acetate solvent. Upon phase separation the amyl acetate was substantially completely stripped of its dihydroquercetin content and the dihydroquercetin was concentrated in a relatively small volume of water.

The aqueous solution of the sodium salt of dihydroquercetin was treated with 32 ml. of 10 N aqueous sulfuric acid which was sufficient to reduce the pH value to approximately 3. The sodium salt was decomposed to free dihydroquercetin which precipitated as light-colored needle-like crystals. 28 grams of crude dihydroquercetin having a purity of 95% was obtained. This yield is equivalent to 71.5% of the original dihydroquercetin.

Example II

A cork-rich Douglas fir bark fraction was prepared by comminuting whole bark and screening the product under carefully specified conditions of moisture content, screen size and type of screening motion. The acceptable fraction contained 63% cork, 17% bark fiber and 20% parenchyma tissue.

100 grams of this cork fraction (oven dry basis) was batch-extracted with 1000 ml. of water maintained at the boiling point for one hour. The resulting extract contained 11.9 grams of extract solids. The extract was concentrated by evaporation of water to 100 ml. and was thoroughly shaken with 100 ml. of amyl acetate. The amyl acetate solution was separated from the water phase, extracted with aqueous caustic solution, which was separated and re-acidified as described in Example I. 3.9 grams of white needle-like crystals of dihydroquercetin of high purity was obtained. This represented 65.5% of the theoretical yield.

Example III

The aqueous solution remaining after the amyl acetate treatment of Example I was evaporated to dryness. The solid material was added to a laboratory sample of commercial oil well drilling mud at the relative rate of four pounds per barrel of mud. There was no evidence of air entrainment or other characteristics of foaming upon prolonged, vigorous stirring.

Having now described our invention and the manner in which it may be used, what we claim as new and desire to protect by Letters Patent is:

1. The process of extracting dihydroquercetin containing barks with water, contacting said water extract with amyl acetate and separating the two solvent phases.

2. The process of treating an aqueous extract of bark material containing dihydroquercetin and other soluble bark components comprising contacting said aqueous extract with amyl acetate, separating the two solvent phases to provide a first solution of dihydroquercetin in amyl acetate and a second aqueous solution of the other soluble bark components.

3. The process of obtaining dihydroquercetin from an aqueous solution containing the same comprising contacting said aqueous solution with amyl acetate and separating the two solvent phases to provide an amyl acetate solution containing dihydroquercetin and recovering the dihydroquercetin from said amyl acetate solution.

4. The process of claim 1 in which the temperature is in the range of 75° C., and the pH of the aqueous extract is approximately 6.

5. The process of claim 2 in which the temperature is in the range of 75° C., and the pH of the aqueous extract is approximately 6.

6. The process of claim 3 in which the temperature is in the range of 75° C., and the pH of the aqueous extract is approximately 6.

7. The process of claim 3 in which said dihydroquercetin is recovered from said amyl acetate solution by adding an alkali to said amyl acetate solution in a quantity sufficient to transform said dihydroquercetin to its soluble alkali salt, adding water to said solution, separating said aqueous phase from said amyl acetate phase, acidifying said aqueous phase and crystallizing said dihydroquercetin.

References Cited in the file of this patent

UNITED STATES PATENTS

| | | |
|---|---|---|
| 2,662,893 | Kurth | Dec. 15, 1953 |
| 2,681,907 | Wender | June 22, 1954 |
| 2,870,165 | Hergert | Jan. 20, 1959 |

OTHER REFERENCES

Kurth: Ind. Eng. Chemistry, vol. 45, pp. 2096–2097 (1953).